No. 675,931. Patented June 11, 1901.
L. E. G. CAURO.
ELECTRIC METER.
(Application filed Dec. 31, 1897.)
(No Model.) 3 Sheets—Sheet 1.
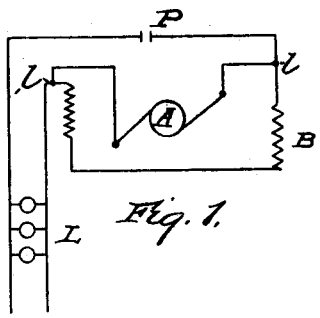
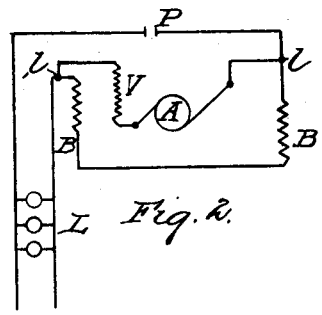
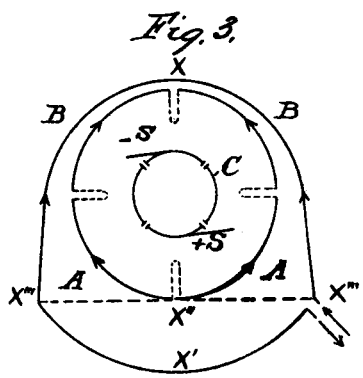
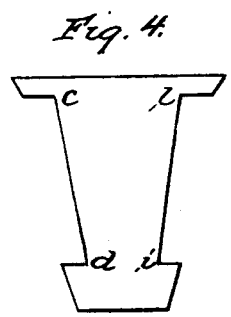
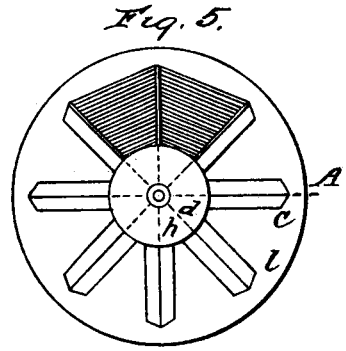
Inventor,
Luigi Enrico Giuseppe Cauro, No. 675,931. Patented June 11, 1901.
L. E. G. CAURO.
ELECTRIC METER.
(Application filed Dec. 31, 1897.)
(No Model.) 3 Sheets—Sheet 2.

Attest:
Inventor,
Luigi Enrico Giuseppe Cauro,
By Richards &
Attys.

No. 675,931. Patented June 11, 1901.
L. E. G. CAURO.
ELECTRIC METER.
(Application filed Dec. 31, 1897.)
(No Model.) 3 Sheets—Sheet 3.

WITNESSES:

INVENTOR
Luigi Enrico Giuseppe Cauro

ATTORNEYS

UNITED STATES PATENT OFFICE.

LUIGI ENRICO GUISEPPE CAURO, OF NAPLES, ITALY.

ELECTRIC METER.

SPECIFICATION forming part of Letters Patent No. 675,931, dated June 11, 1901.

Application filed December 31, 1897. Serial No. 665,201. (No model.)

*To all whom it may concern:*

Be it known that I, LUIGI ENRICO GUISEPPE CAURO, a subject of the King of Italy, residing at Naples, Italy, have invented certain new and useful Improvements in Electric Meters, (for which I have obtained patents in Italy, Vol. LXXXV, No. 230, dated December 31, 1896, and in France, No. 264,234, dated February 9, 1897,) of which the following is a full and clear specification.

The present invention concerns an apparatus for measuring electrical energy belonging to the category of motor-meters provided with an auxiliary winding arranged in series with the induction or armature core, the field of which is intended to overcome the passive resistances, in which a mechanical magnetic stop prevents the meter from running uncharged when the light-consuming apparatuses are disconnected, being consequently inactive.

Figure 6:
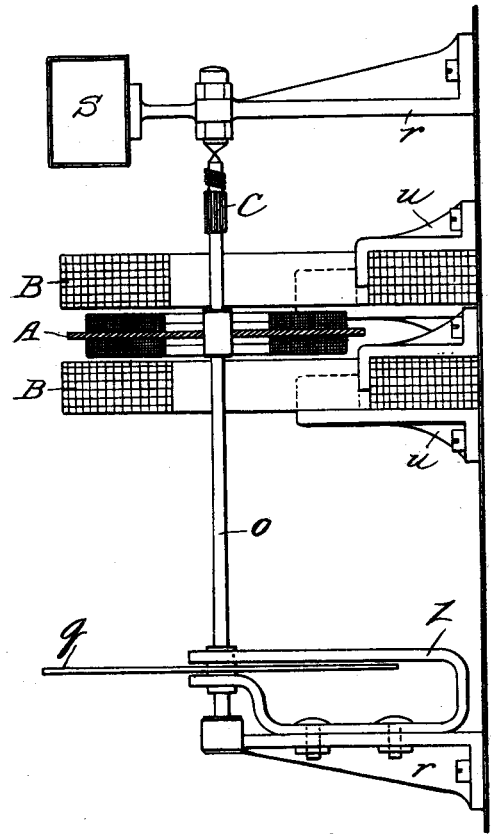
Figure 7:
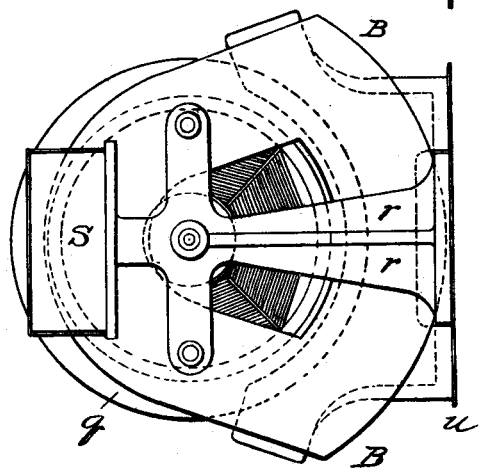
Figure 8:
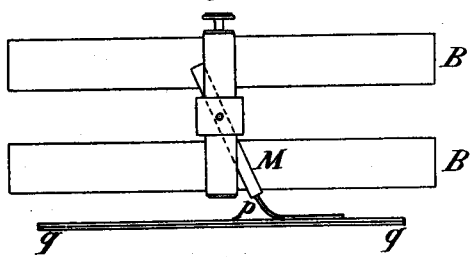
Figure 9:
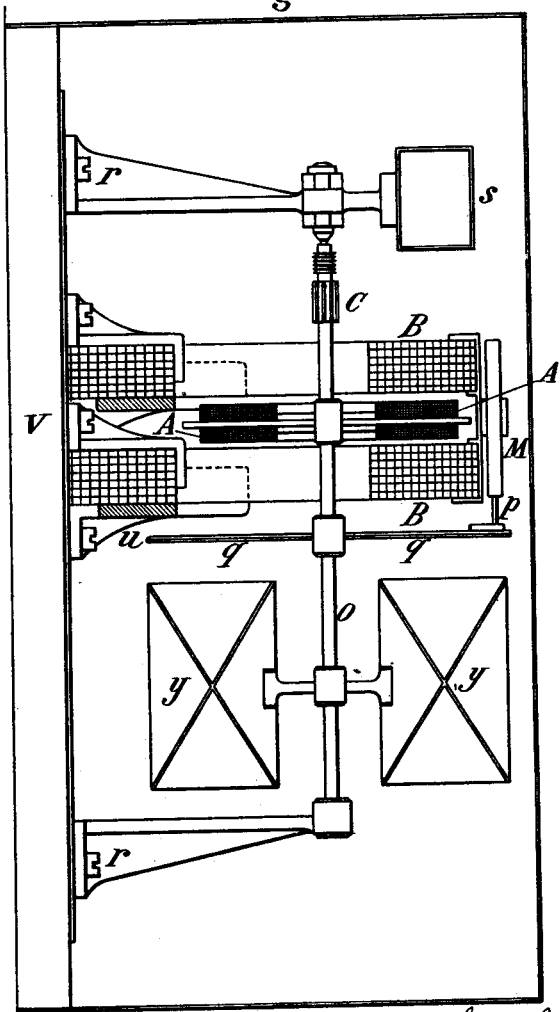

For a perfect understanding of the invention I will describe the same in connection with the accompanying drawings, in which—
Figure 1 is a diagram view of the motor of a meter, the field of which is passed in series connection by the current. Fig. 2 is a diagram view of the same meter, in which the passive resistances are eliminated by the addition of a supplementary winding. Fig. 3 is a diagram view of the motor and its magnetic field. Figs. 4 and 5 are detail views of the armature of the motor. Figs. 6 and 7 are respectively a longitudinal section and horizontal projection of the motor, and Figs. 8 and 9 are views relating to the brake.

Meters of this kind can work empty, (uncharged,) and they generally consist of an electric motor the field of which is passed in series connection by the current going to the lights or consuming apparatus and the armature on the outside wires of the circuits feeding these apparatuses.

In Fig. 1, A is the armature, represented by its collector, and B is the field. P is the source of electricity. L represents the service apparatus. It has been attempted to remedy this drawback by adding a field formed by a winding in series connection with the armature. The diagram Fig. 2 shows this auxiliary winding $v$ intended to overcome the frictional resistances. It appears that when the potential increases at the extremities $l$ the field created by $v$ can attain a sufficient strength to start A, although the apparatuses L may not be in action. In this case the meter would give indications which would be wrong, as the meter works empty. This defect applicant has sought to overcome in the present case. In this connection I will add that the mechanical labor developed by the armature A in its revolution must be taken up or absorbed, so that the armature itself cannot attain an exaggerated speed. The absorption of this mechanical labor can be readily effected in two ways:

First. Either by making a non-magnetic disk part of the shaft of the armature, said disk turning between the poles of a stationary magnet. The currents generated in the disk are transformed into heat equivalent to the mechanical labor developed by the armature.

Second. Or by making vanes or wings, which beat the air part of the shaft of the armature.

*Electric fields of the motor.*—This field consists of two coils of conducting-wire, the area of the right section of which is in proportion to the intensity of the current which shall pass through it. The form of each coil is shown by the line B, Fig. 3. The same diagram shows the relative position of the field B and of the armature A, the center of which is placed on the symmetrical axis X X' X'' of B. The action of the field B on the armature A serves to rotate the armature, each element of which would tend to adapt its symmetrical axis on X X' X'' and to stop in that terminal position unless the commutator C, suitably loosened, as in any other electrical motor, would not change the direction of the current in the interested element or part before it has attained the above terminal position.

*Armature of the electric motor.*—This armature belongs to the disk type and its parts are mechanically entirely independent of each other. It has no iron core and may consist of any amount of elements. Ordinarily it has eight of them. (See Figs. 4 and 5.) These are obtained as follows: On a sheet of nonmagnetic material is braced a regular octagon. In laying out the radii of the octagon eight equal triangular sectors are obtained, which are cut up so as to give them the shape as in Fig. 4. Then the wire is wound on (at most to a sixth of a millimeter in diameter) the part $c\,d\,i\,l$ in the normal direction of the axis of symmetry. When the eight elements are wound they are connected and the armature as shown in Fig. 5 is obtained, where the full coils represent two wound elements and the other six are as many unwound elements. The ends of the windings are connected with the collector in the same manner as employed in an armature of a two-pole motor. This armature does not belong to any of the types now known, because in all these each elementary winding is on a level passing through the shaft of the armature, while in the armature under consideration each elementary winding is on a level parallel to the axis proper.

In Figs. 6 and 7, which represent, respectively, a longitudinal section and the horizontal projection of the motor apparatus, the armature A is fixed to a vertical shaft $o$, which runs into two hardened points, the lower of which rests on a hard concave stone, which serves as guide for the point. These two supporting-points are carried by supports $r$, the upper one of which carries the multiplier S, which receives the motion by way of the shaft $o$ by means of an endless screw. Two supporting-arms $u$ carry the two coils B. The metallic disk $q$ on $o$ and the magnet $z$ take up the mechanical labor produced by the armature. Finally all these parts are fixed on a metallic frame possessing as much rigidity as possible, and this frame also carries the terminals for the connections of the apparatus to the exterior circuit, also the winding intended to overcome the passive resistances, and also the brake.

*Brake.*—To overcome the above drawback, as set forth in the specification, the brake shown in Fig. 8 has been provided. A permanent or artificial magnet M, Fig. 8, can pivot at a point near its center of attraction and ends at its lower part into a tail $p$, which can press on a disk $q$, fixed on the shaft $o$, said disk having advantageously a rough surface. If the magnet M is arranged on a parallel plane with the shaft $o$ and inclined on the vertical line and if the poles are of such sign that the action of the windings B traversed by the current is repellent, the magnet will pivot so as to lift the tail $p$ off the disk $q$ and the latter, with all its movable gear, will become free to turn, while heretofore all rotation was prevented when the current did not traverse the windings B. Hence it follows that as the compensation of passive resistances can be carried in this manner as far as necessary the meter will be very sensitive and very exact.

In Fig. 9 the brake is applied parallel to the axle $o$, and it consists of the same pieces as in Fig. 8—viz., the magnet M, its tailpiece $p$, and the disk $q$.

Air-wings $y$ serve as retarding devices for the shaft $o$.

I claim—

A meter for electric energy, (of the class having an auxiliary electric field intended to overcome frictional resistances) provided with an auxiliary winding in series connection with an induction or armature coil, the field of which is intended to overcome passive resistances, and with an automatic brake for preventing the moving parts revolving when the working apparatus is out of operation in the circuit, for which the meter counts the consumption, said brake comprising a disk on the shaft of the armature and a magnet having a tail to bear on the said disk, said magnet being arranged adjacent to the field-coil, substantially as described.

In witness whereof I have hereunto set my hand in presence of two witnesses.

LUIGI ENRICO GUISEPPE CAURO.

Witnesses:
 HENRY W. GARGUILS,
 H. M. BYINGTON.